United States Patent [19]
Loesch

[11] 3,887,851
[45] June 3, 1975

[54] TENSION SPEED CONTROL FOR A ROTATABLE STRAND SUPPLY UTILIZING A TRANSFORMER HAVING VARIABLE PRIMARY AND SECONDARY WINDINGS

[75] Inventor: Robert Phillip Loesch, Tonawanda, N.Y.

[73] Assignee: Western Electric Company, Incorporated, New York, N.Y.

[22] Filed: Dec. 19, 1973

[21] Appl. No.: 426,179

[52] U.S. Cl. .................... 318/6; 242/45; 242/75.51
[51] Int. Cl. ............................................ H02p 1/56
[58] Field of Search ................ 318/6; 242/45, 75.51

[56] References Cited
UNITED STATES PATENTS

| | | | |
|---|---|---|---|
| 2,844,773 | 7/1958 | Turner et al. | 318/6 |
| 2,981,491 | 4/1961 | Eans, Jr. | 318/6 X |
| 3,082,361 | 3/1963 | Lohest | 318/6 |

*Primary Examiner*—B. Dobeck
*Attorney, Agent, or Firm*—A. C. Schwarz, Jr.

[57] ABSTRACT

A system for controlling the tension in a strand being unwound from a driven rotatable supply includes a tension sensing dancer unit, including a dancer roll or sheave rotatably mounted on an arm fixed to a rotatable shaft between first and second spaced idler sheaves coaxially mounted on the shaft. The strand is passed serially around the first idler sheave, the dancer sheave and the second idler sheave in the path between the supply and a strand processing facility. Pivotal movement of the dancer arm in response to changes in tension in the strand causes corresponding angular movement of the shaft about its axis. A contactor mounted on the end of the shaft is associated with a toroidal core transformer having an excited primary winding and secondary winding circumferentially spaced around an iron core. One side of the primary winding and one side of the secondary winding are connected as two output circuits having the contactor as an output common to supply electrical energy to the supply driving means. Variable driving torque is imparted to the supply by the driving means when the contactor is positioned on the transformer secondary winding, and variable retarding torque is imparted to the supply when the contactor is positioned on the transformer primary winding, in accordance with the sensed strand tension, to maintain a constant tension on the strand. The contactor thus acts both to vary the applied torque and as a switch to characterize the output circuit to the driving means, which may be a single electric motor, for example, a selectively reversibly driven d.c. motor or a pair of motors, for example, two single-phase induction motors selectively driven in opposite directions. Because the transformer windings are separate, electrical isolation is provided between the two output circuits.

6 Claims, 5 Drawing Figures

TENSION SPEED CONTROL FOR A ROTATABLE STRAND SUPPLY UTILIZING A TRANSFORMER HAVING VARIABLE PRIMARY AND SECONDARY WINDINGS

BACKGROUND OF THE INVENTION

1. Field of the Invention

The present invention relates to a tension control system for a rotatable supply of strand material, and more particularly, to a speed control system for a strand supply reel or the like, wherein the tension in the strand varies the primary or the secondary winding of a two winding transformer to control the torque supplied to the reel by a driving means to control the payout of strand from the reel.

2. Background and Prior Art

The necessity of keeping a constant tension in an elongated article being fed at a constant linear speed is particularly important in the manufacture of communications cables. In manufacturing communications cables, wires, which may be insulated with pulp or plastic material, are twisted together in pairs and taken up on supply reels. The supply reels are rotatably mounted on a supply stand which may include several rows of supply reel payoff positions, depending upon the number of pairs to be included in the cable. The pairs are stranded together into a cable core by advancing the pairs from the supply reels at a constant linear speed in converging paths through openings in an oscillating face plate to a binder which wraps at least one binder thread about the grouped pairs as the cable core is formed.

In driving the supply reels, it is necessary to control their rotational speed as well as the tension in the wires to compensate for the changing diameter of the supply on the reel and to insure that the rate at which the wires are paid out matches the rate at which the cable core is advanced.

One system for controlling the payout of a strand from a supply reel is taught in U.S. Pat. No. 2,844,773 wherein the speed of a two-phase induction motor is varied in accordance with changes in the tension of the strand being paid out. The changes in tension are sensed by a dancer unit which varies the angular position of a contact slider on a variable autotransformer having a fixed end tap and a fixed intermediate tap. The motor control winding is connected between the intermediate tap and the slider. The intermediate tap is also connected to a mid-tap on the motor main winding which has two supply terminals of a three-phase supply of electrical energy connected thereacross. The third terminal of the supply is connected to the fixed end tap of the transformer. The output voltage of the autotransformer is either in-phase or out-of-phase with the input voltage thereto, depending upon the position of the slider, to drive the motor in opposite directions to compensate for changes in tension. The foregoing control system, among other things, requires a two-phase motor, a three-phase supply, is capable of controlling only a single motor and provides no electrical isolation between the circuit portions thereof providing forward and reverse torque voltages to the motor.

A similar system for paying out linear material, for example, grid electrode wire, the movement of which is intermittently interrupted, is taught in U.S. Pat. No. 2,981,491. In this system the main motor winding of a capacitor-start induction motor is connected across the output secondary of a transformer, the primary of which is connected to a moveable tap of a variable autotransformer having a fixed end tap and a fixed intermediate tap which are connected across an excitation source. While only a single-phase supply is required for this system, it is capable of controlling only a single motor and provides no electrical isolation between the circuit portions thereof providing forward and reverse torque-producing voltages to the motor.

SUMMARY OF THE INVENTION

It is the object of the present invention to provide a new and improved system for feeding a strand at a controlled longitudinal speed under uniform tension.

A further object of the present invention is to provide a new and improved motor control system for feeding a strand at a controlled uniform speed under a constant tension from a reversibly driven rotatable strand supply wherein electrical isolation is provided between circuits reversibly driving the rotatable supply.

A further object of the present invention is to provide a new and improved system for paying out a strand from a rotatable supply thereof while continuously providing for uniform constant tension in the strand wherein various types of electrical motors may be utilized to drive the supply and wherein one or two motors may be provided to control the payout of a single strand.

A further object of the present invention is to provide a new and improved tension speed control system utilizing a two-winding transformer having a moveable contactor which varies both the primary and the secondary windings of the transformer.

With these and other objects in view, a new and improved system for controlling the payout of a strand from a rotatable supply may include a transformer having a primary winding and a secondary winding, means for connecting the primary winding of the transformer to an excitation source, a moveable contactor positionable on the transformer windings, means responsive to variations in tension in the strand for moving the transformer contactor, and driving means connected to one side of the primary winding, one side of the secondary winding and the moveable contractor, for imparting to the rotatable supply a torque in a first direction when the contactor is positioned on the primary winding, and in a second opposite direction when the contactor is positioned on the secondary winding.

BRIEF DESCRIPTION OF THE DRAWINGS

A complete understanding of the invention may be obtained from the following detailed description of two embodiments thereof, when read in conjunction with the accompanying drawings, wherein.

DETAILED DESCRIPTION

Figure 1:
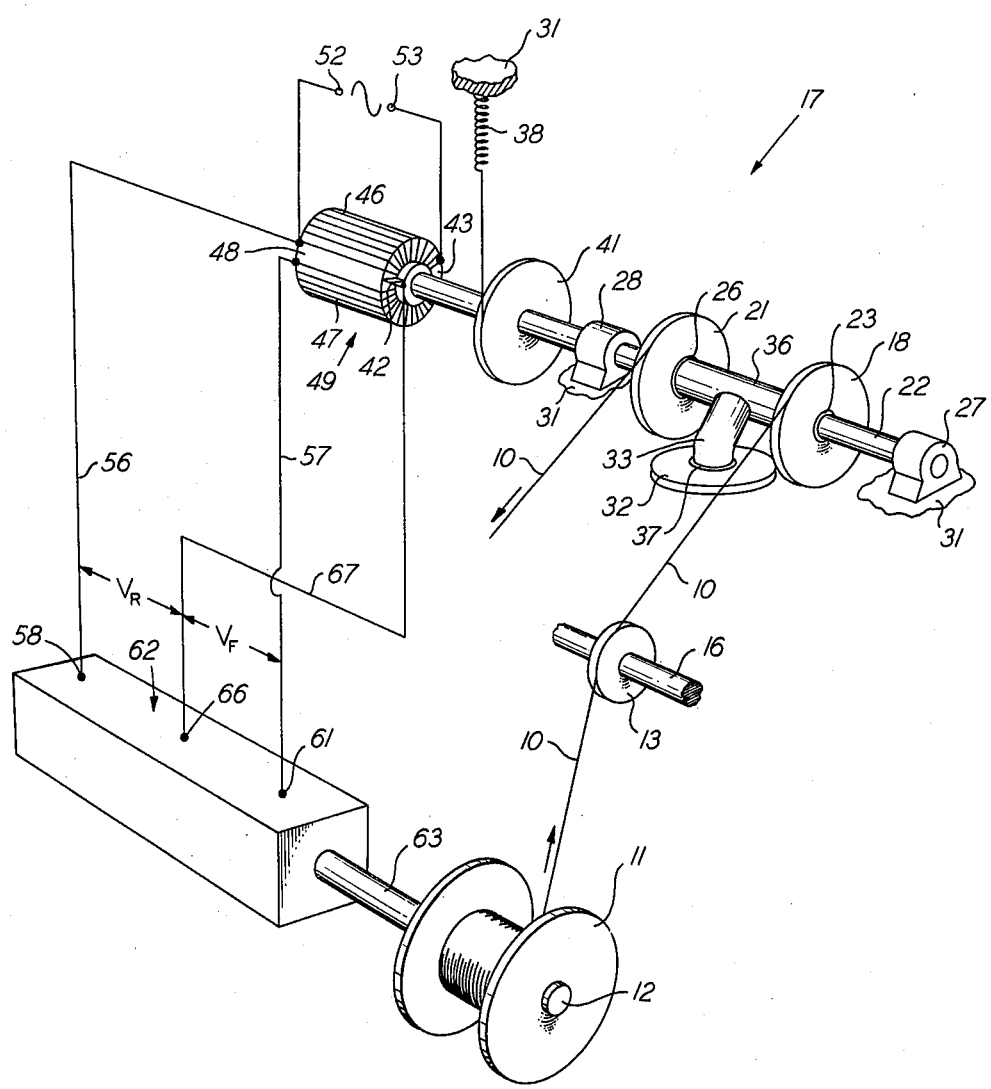
FIG. 1 is a perspective illustration of a tension control system for feeding or paying out a strand in accordance with the present invention.

Referring to FIG. 1, a strand 10 is advanced from a supply thereof contained on a reel 11 mounted on a driven arbor 12 around a guide sheave 13 rotatably mounted on a shaft 16 and through a strand tensioning unit 17. The strand 10 may be, for example, a twisted pair of insulated wires which may be advanced longitudinally with other pairs of insulated wires from other supply reels in converging paths to a stranding apparatus to form a cable core.

The tensioning unit 17 includes first and second idler sheaves 18 and 21 mounted for independent rotation on a rotatable shaft 22 through suitable bearings 23 and 26, respectively. The shaft 22 is journaled in first and second blocks 27 and 28 secured to a support frame 31, only the essential portions of which are shown. A dancer sheave 32 is rotatably mounted on an arm 33, fixed to a sleeve 36 keyed to the shaft 22, through suitable bearings 37.

The strand 10 passes clockwise, partially around the idler sheave 18, around the outer periphery of the dancer sheave 32 and counterclockwise partially around the sheave 21. The arrangement of the sheaves 18, 21 and 32 may be similar to the arrangement disclosed in E. J. McIlvried U.S. Pat. No. 2,755,916, which shows a related strand tensioning unit. It is preferred that the strand 10 not pass completely around any of the sheaves. The arm 33 is bent to permit the principal plane of rotation of the dancer sheave 32 to be horizontal and generally tangent to the idler sheaves 18 and 21. A tension spring 38 is connected between an upper portion of the frame 31 and a disc 41 fixed to the shaft 22. The spring 38, as will be understood from the discussion below, governs the amount of tension applied to the strand 10 by the tensioning unit 17. A moveable tap or contactor 42 extends radially from a sleeve 43 keyed to the shaft 22. The contactor 42 selectively engages sections of a primary winding 46 or a secondary winding 47 circumferentially wound around a toroidal core 48, preferably iron, of a transformer 49 according to the angular position of the shaft 22 which is governed by the tension in the spring 38 and the angular position of the arm 33 and the dancer sheave 32. Clockwise rotation of the arm 33 rotates the shaft 22 and the contactor 42 clockwise, tending to wind the strand simultaneously around both idler sheaves 18 and 21. Similarly, counterclockwise rotation of the arm 33 rotates the shaft 22 and the contactor 42 counterclockwise, tending to unwind the strand 10 simultaneously from both idler sheaves 18 and 21.

The primary winding 46 of the transformer 49 is connected across a suitable excitation source by means of terminals 52 and 53. The source may provide, for example, 120 volts at 60 hz. One end of the primary winding 46 and the adjacent end of the secondary winding 47 are connected by a pair of output leads 56 and 57, respectively, to a pair of input terminals 58 and 61, respectively of an electrically operated driving means 62 having a driven output shaft 63 coupled to the arbor 12 directly or through a suitable speed reducing means selectively to impart forward or driving torque or reverse or retarding torque to the supply reel 11.

The contactor 42 is connected to a terminal 66 on the driving means 62 through a common output lead 67. When the contactor 42 engages the secondary winding 47 of the transformer 49, an output voltage $V_F$ appears across the input terminals 61 and 66 of the driving means 62, supplying energy thereto for driving the shaft 63 counterclockwise to pay out the strand 10. The forward speed at which the shaft 63 and the reel 11 are driven is dependent upon the magnitude of the voltage $V_F$ which is dependent upon the position of the contactor 42 on the transformer secondary winding 47. When the contactor 42 engages the primary winding 46 of the transformer 49, an output voltage $V_R$ appears across the input terminals 58 and 66 of the driving means 62, supplying energy thereto for driving the shaft 63 clockwise to apply a retarding torque to the reel 11 to slow down and/or reverse the direction of the strand 10 being paid out therefrom. The magnitude of the retarding torque is dependent upon the position of the contactor 42 on the primary winding 46 of the transformer 49 which controls the magnitude of the output voltage $V_R$.

Figure 2:
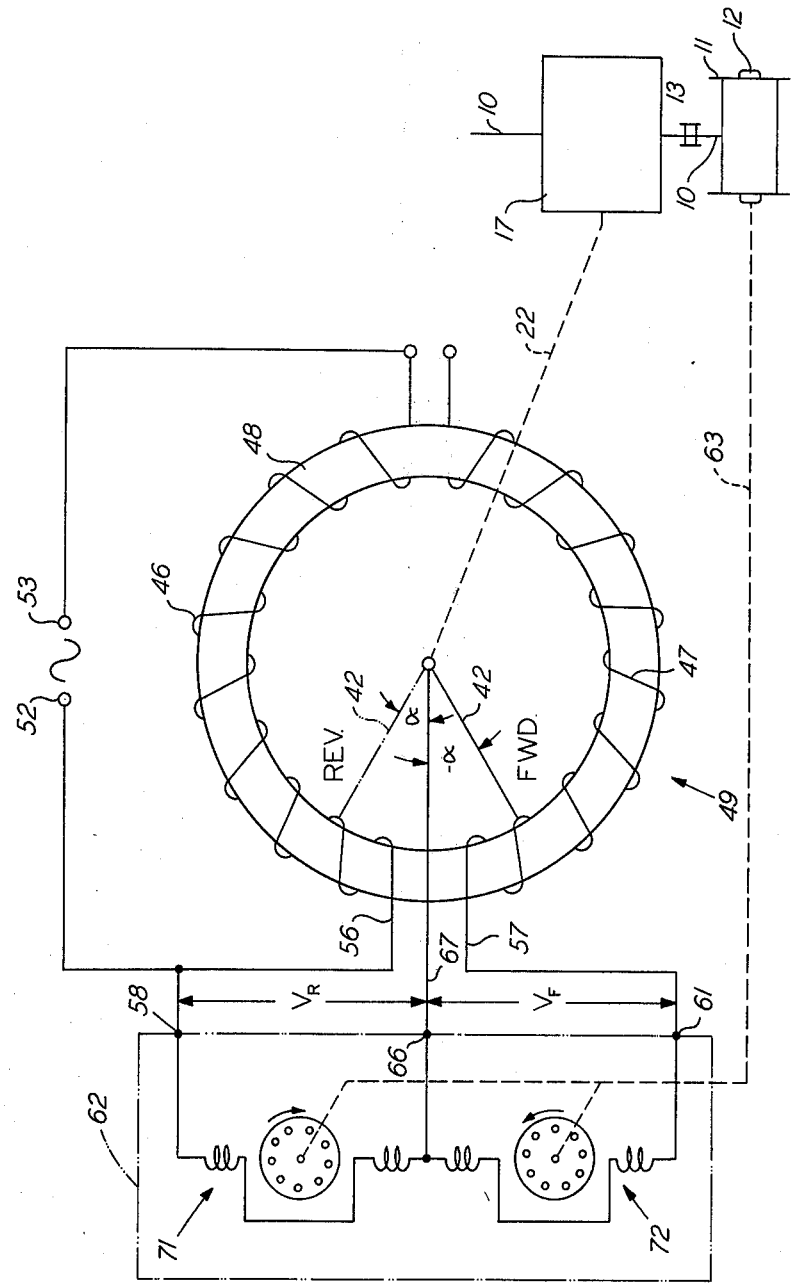
FIG. 2 is an electrical schematic diagram of one embodiment of the system illustrated in FIG. 1.
Figure 3:
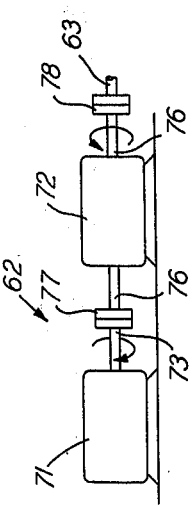
FIG. 3 is an illustration of one arrangement of a pair of induction motors utilized to control a rotatable strand supply.

Referring to FIG. 2, there is shown a schematic diagram of the system of FIG. 1, wherein the driving means 62 includes first and second single-phase induction motors 71 and 72, which are preferably of the shaded-pole type, coupled to one another and the drive shaft 63 as shown in FIG. 3.

An output shaft 73 of the motor 71 is connected to an output shaft 76 of the motor 72 through a shaft coupling 77. Similarly, the output shaft 76 of the motor 72 is coupled to the drive shaft 63 through a shaft coupling 78. When the contactor 42 engages the transformer secondary winding 47, the voltage $V_F$ across the input terminals 61 and 66 of the driving means 62 drives the motor 72 in the forward direction as defined by the arrows in FIGS. 2 and 3 to impart driving torque counterclockwise to the drive shaft 63 through the motor output shaft 76 and the coupling 78. Similarly, when the contactor 42 engages the transformer primary winding 46, the voltage $V_R$ across the input terminals 58 and 66 drives the motor 71 in the reverse direction to impart retarding torque clockwise to the drive shaft 63 through the motor output shaft 73, the coupling 77, the shaft 76 and the coupling 78.

It will be seen that no energy is supplied to the motor 71 while the motor 72 is energized at its input terminals 61 and 66 and that no energy is supplied to the motor 72 while the motor 71 is energized at its input terminals 58 and 66. The system thus provides electrical isolation between the forward and reverse energy producing circuits.

In operation, with the source at the terminals 52 and 53 activated through suitable switching means or the like and the contactor 42 engaging a suitable section of the transformer secondary winding 47, the primary winding 46 is directly excited and induces a current in the secondary winding 47 to produce $V_F$ to drive the motor 72 and the shaft 63 to pay out the strand 10 from the reel 11 through the tensioning unit 17. As the reel 11 accelerates, the advancing strand 10 rotates the idler sheaves 18 and 21 (FIG. 1) clockwise and counterclockwise, respectively, and the dancer sheave 32 is rotated, pivoting the arm 33 counterclockwise, causing the shaft 22 and the contactor 42 to turn counterclockwise against the force exerted on the shaft 22 by the tension spring 38 until the torques exerted on the shaft 22 by the dancer sheave 32 and the spring 38 are equal. The advancing strand 10 thus has a predetermined tension imparted to it by the tensioning unit 17.

If the tension in the strand 10 should decrease, the spring 38 will cause the shaft 22 to rotate clockwise, rotating the contactor 42 clockwise to decrease the number of turns of the transformer secondary winding 47 connected across the input terminals 61 and 66 of the motor 72 to decrease the electrical potential $V_F$ supplied thereto to decrease the speed thereof and the torque imparted to the drive shaft 63. This action will continue until the opposing torques on the shaft 22 are balanced. This amy require the shaft 22 and the contactor 42 to rotate so far clockwise that the contactor is disengaged from the secondary winding 47, such that no electrical energy is supplied to the motor 72 and no driving torque is imparted thereby to the shaft 63. It may further require that the shaft 22·turn even further clockwise to engage the primary winding 46 of the transformer 49, energizing the motor 71 by applying $V_R$ across the input terminals 58 and 66 to apply retarding torque to the shaft 63 and the reel 11. The tension in the strand 11 will then increase, causing the dancer sheave 32 to pivot the shaft 22 and the contactor 42 counterclockwise, until the contactor 42 engages the secondary winding 47 to apply driving torque to the reel 11.

Figure 4:
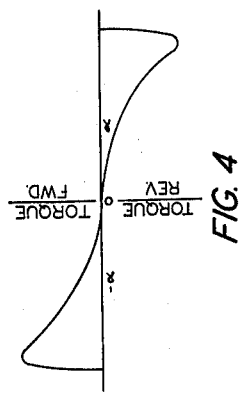
FIG. 4 is a characteristic curve illustrating forward and reverse torque as a function of the angular position of a moveable tap on a two-winding transformer utilized to provide the eletrical driving energy to a strand supply driving means in accordance with the present invention.

Should the strand 10 break, the spring 38 would cause the shaft 22 and the contactor 42 to rotate quickly in the clockwise direction to apply reverse driving energy to the reel 11 through the motor 71 and the shaft 63 to take-up the strand 10 on the reel 11, avoiding the problem of strand spillage. break, The system thus provides for precise control of the payout of the strand 10 under constant tension. The contactor 42 acts as a switch between the forward and reverse drive motors 72 and 71, providing electrical isolation between them. This is illustrated also in the curve of FIG. 4 which is a characteristic of the torque imparted to the reel 11 by the driving means 62 as a function of the angular position of the shaft 22 and the contactor 42. The angle of the shaft 22 and the contactor 42, α, is defined as positive in the clockwise direction and negative in a counterclockwise direction from a zero position defined at 9 o'clock in FIG. 2.

The provision of a moveable contactor 42 which varies both the primary winding 46 and the secondary winding 47 of the two-winding transformer 49 selectively causes the transformer 49 to act as a pair of variable autotransformers, the first, represented by the primary winding 46 and having an input voltage directly applied thereto, and the second represented by the secondary winding 47 and having the input voltage induced therein by the primary winding 46.

The motors 71 and 72 are preferably identical, in which case the turns ratio of the transformer 49 is unity. However, the motors 71 and 72 may be of different fractional horsepower ratings, in which case the transformer turns ratio may be selected to correspond to the rated difference. Thus, the system of the invention may be made to respond quickly to variations in the tensions of the strand 10 to provide a constant tension therein.

Figure 5:
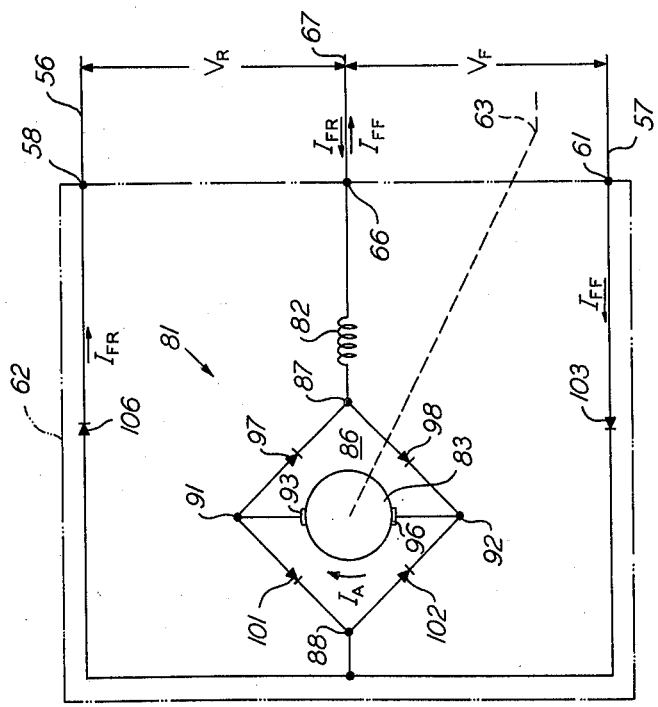
FIG. 5 is an electrical schematic diagram of a portion of an alternative embodiment of the system illustrated in FIG. 1.

An alternative embodiment of the invention is shown in FIG. 5. A self-excited, direct current series motor, indicated generally at 81, having a field winding 82 and an armature 83, may be reversibly driven in accordance with the above-described scheme. This is made possible by utilizing the fact that a direct current may be driven in opposite directions by reversing either the field current or the armature current.

The field winding 82 is connected in electrical series with the armature 83 through a bridge rectifier 86 having input terminals 87 and 88 and output terminals 91 and 92. The field winding 82 is connected between the input terminal 66 of the motor 81 and the input terminal 87 of the bridge rectifier 86. The armature 83 is connected to the output terminals 91 and 92 of the bridge rectifier 86 through brushes 93 and 96, respectively.

The bridge rectifier 86 comprises four semiconductor diodes 97, 98, 101 and 102 connected as a full wave rectifier.

A semiconductor diode 103 is connected in the forward current carrying direction between the input terminals 61 of the motor 81 and the input terminal 88 of the bridge rectifier 86. A semiconductor diode 106 is connected in the forward current carrying direction between the input terminals 88 of the bridge rectifier 86 and the input terminals 58 of the motor 81. The diodes 103 and 106 act as half-wave rectifiers to provide field current in a forward direction, $I_{FF}$, when the contactor 42 is positioned on the secondary winding 47 of the transformer 49 and field current $I_{FR}$ in a reverse direction when the contactor 42 is positioned on the primary winding 46 of the transformer 49.

Regardless of which direction the field current flows, the armature current $I_A$ always flows into the brush 96 and out of the brush 93 due to the bridge rectifier 86. In operation, when the tensioning unit 17 positions the contactor 42 on the secondary winding 47 of the transformer 49, forward field current $I_{FF}$ flows clockwise in FIG. 5 into the motor input terminal 61 through the diodes 103 and 102 into the brush 96, out of the brush 93, through the diode 97 and the field winding 82 and out of the common terminal 66 to drive the motor 81 in the forward direction to impart driving torque to the drive shaft 63 and the reel 11.

When the tensioning unit 17 positions the contactor 42 on the primary winding 46 of the transformer 49, reverse field current $I_{FR}$ flows clockwise into the motor common terminal 66 through the field winding 82 and the diode 98, into the brush 96, out of the brush 93, through the diodes 101 and 106 and out of the terminal 58 to drive the motor 81 in the reverse direction to impart a retarding or reverse torque to the drive shaft 63 and the reel 11. The modified system of FIG. 5 operates similarly to the system of FIG. 2 to control the tension in the strand 10 being paid out from the reel 11.

Though a specific embodiment of a tensioning device 17 has been shown, it will be appreciated that other suitable strand tensioning devices of the dancer roll type may be employed. Similarly, the tension control system of the invention is capable of operating with a.c. or d.c. electrical motors of types other than those specifically set forth. For example, the system can operate with one or two self-excited direct current motors including shunt or compound type motors by employing suitable current rectification. Other suitable types of electric motors capable of applying forward and reverse torques to an output drive shaft utilizing the principles of the invention set forth herein may be utilized.

It is believed that the operation of the foregoing system is apparent from the above description. While the system has been described as being suitable for controlling the tension in a pair of twisted insulated wires, the term "strand" as used herein is meant to encompass other types of flexible elongated articles which are capable of being placed under tension, for example, bare and insulated wire singles, cable cores, cables, yarn, rovings, slivers, tapes, strips and the like. It will be obvious that various changes and modifications may be made therein without departing from the spirit and scope of the invention, as defined in the annexed claims.

What is claimed is:

1. A system for controlling the paying out of a strand from a rotatable supply thereof which comprises:
    a transformer having a primary winding and a secondary winding;
    a moveable contactor positionable on said transformer windings;
    means for connecting said primary winding to an excitation source;
    means responsible to variations in tension in said strand for moving said transformer contactor; and
    driving means connected to one side of said primary winding, one side of said secondary winding and said moveable contactor for imparting a torque in a first direction to said rotatable supply when said contactor is positioned on said primary winding and for imparting a torque in a second opposite direction to said rotatable supply when said contactor is positioned on said secondary winding.

2. A system as set forth in claim 1 wherein said driving means includes:
    first and second induction motors, each having first and second input terminals;
    means coupling said motors to a common output shaft;
    means coupling said common output shaft to said rotatable supply;
    means connecting said moveable tap to said first input terminal of each of said motors;
    means connecting said second input terminal of said first motor to one side of said primary winding to drive said first motor when said moveable tap engages a turn of said primary winding; and
    means connecting said second input terminal of said second motor to one side of said secondary winding to drive said second motor when said moveable tap is positioned to engage a turn on said secondary winding.

3. A system as set forth in claim 1 wherein said driving means includes:
    a self-excited direct current series motor;
    means connecting said moveable contactor to one side of the field winding of said motor;
    full-wave rectifier mens having a pair of input terminals and a pair of output terminals;
    means connecting the armature of said motor to the output terminals of said full-wave rectifier means;
    means connecting the other side of said field winding to a first of said input terminals of said full-wave rectifier means;
    first half-wave rectifier means connecting the second of said input terminals of said full-wave rectifier means to one side of said secondary winding to impress a current in a first direction through said field winding when said contactor is positioned on said secondary winding to drive said motor in a first direction;
    second half-wave rectifier means connecting said second input terminal of said full-wave rectifier means to one side of said primary winding to impress a current in a second opposite direction through said field winding when said contactor is positioned on said primary winding to drive said motor in a second opposite direction; and
    means driveably coupling the output of said motor to said rotatable supply.

4. A system for controlling the torque imparted to a supply of strand material by a supply driving means to pay out the strand, which comprises:
    a transformer having a primary winding and a secondary winding;
    means for connecting said primary winding to a source of alternating current;
    selective means for connecting a variable portion of the output of said primary winding to the driving means to retard the torque applied to said supply and for connecting a variable portion of the electrical energy induced in said secondary winding to the driving means to increase the torque applied to said supply;
    means for sensing the tension in the strand; and
    means responsive to the sensed tension in the strand for controlling said selective means to maintain constant tension in the strand.

5. A system for controlling the rotational speed of a supply of strand material being paid out which comprises:
    means for applying a predetermined tension in the strand material and for responding to variations in the tension of the strand material;
    a transformer having a primary winding and a secondary winding;
    a moveable contactor positionable at any turn on said primary winding or said secondary winding;
    means for connecting said primary winding to a source of alternating current;
    means coupling said tension sensing means to said moveable contactor to vary the position thereof in response to changes in strand tension;
    means utilizing the electrical energy output between said moveable contactor and one side of said secondary winding for increasing the payout speed of said supply in response to a sensed increase in tension; and
    means utilizing the electrical energy output between one side of said primary winding and said moveable contactor for decreasing the output speed of said supply in response to a sensed decrease in tension.

6. A system for controlling the tension in a strand being paid out from a rotatably mounted supply being driven which comprises:
    means for imparting a driving torque to said supply to pay out the strand;
    means for imparting a retarding torque to said supply to retard the pay out of strand therefrom;
    a transformer having a primary winding and a secondary winding;
    a moveable tap positionable at any turn on said primary winding or said secondary winding;
    means for connecting said primary winding to a source of alternating current;

means for connecting the electrical energy output between said moveable tap and one side of said secondary winding to drive said driving torque inparting means when said moveable tap engages the secondary winding;

means for connecting the electrical energy output between said moveable tap and one side of said primary winding for driving said retarding torque imparting means when said moveable tap is positioned at a turn on said primary winding;

means for sensing the tension in the strand being paid out from the supply; and means coupling said tension sensing means to said moveable contactor for varying the position thereof in response to changes in the tension of said strand.

* * * * *